United States Patent [19]
Ishida et al.

[11] Patent Number: 5,664,323
[45] Date of Patent: Sep. 9, 1997

[54] APPARATUS FOR PRODUCING VEHICLES

[75] Inventors: Yoshiki Ishida; Keiichi Samekawa; Kenichi Katayama; Yoshifumi Matsumoto; Hideo Ishida; Koichi Kimura, all of Sayama, Japan

[73] Assignee: Honda Giken Kogyo Kabushiki Kaisha, Tokyo, Japan

[21] Appl. No.: 560,371

[22] Filed: Nov. 17, 1995

Related U.S. Application Data

[62] Division of Ser. No. 393,373, Feb. 23, 1995, Pat. No. 5,575,053.

[30] Foreign Application Priority Data

Feb. 25, 1994 [JP] Japan ................................. 6-027783

[51] Int. Cl.⁶ ...................................................... B23P 19/00
[52] U.S. Cl. ........................ 29/822; 198/347.1; 228/47.1
[58] Field of Search ......................... 29/430, 458, 786, 29/793, 783, 791, 822; 198/346.2, 347.1, 347.4; 228/49.8

[56] References Cited

U.S. PATENT DOCUMENTS

| | | | |
|---|---|---|---|
| 4,615,446 | 10/1986 | Pavie | 198/347.2 |
| 4,738,387 | 4/1988 | Jaufmann et al. | 228/49.8 |
| 5,143,270 | 9/1992 | Hamada et al. | 29/793 |

*Primary Examiner*—David P. Bryant
*Attorney, Agent, or Firm*—Nikaido, Marmelstein, Murray & Oram LLP

[57] ABSTRACT

Producing vehicles by using a plurality of production lines allowing the vehicles to successively pass through a welding step, a coating step and an assembling step in each line, in accordance with an increase or decrease in the number of vehicles to be produced in the respective production lines, some of the vehicles in one of the production lines which has less of a margin for production are transferred, after passing through the welding step, to another production line at a portion between its welding step and coating step which line has more of a margin for production. With this arrangement, when it becomes necessary to increase or decrease the number of vehicles in the lines, it is possible to produce vehicles without changing the production ability in the respective steps after the welding step, only by adjusting the number of vehicles in the welding step of the production line which has a less of a margin for production.

3 Claims, 8 Drawing Sheets

APPARATUS FOR PRODUCING VEHICLES

This application is a division of application Ser. No. 08/393,373, filed Feb. 23, 1995, now issued as U.S. Pat. No. 5,575,053.

BACKGROUND OF THE INVENTION

1. Field of the Invention

The present invention relates to a method and apparatus for producing vehicles, by using a plurality of production lines allowing the vehicles to successively pass through a welding step, a coating step and an assembling step in each line.

2. Description of Prior Art

In the past, it has been general that each production line is exclusively used for one or a plurality of types of vehicles.

However, the number of vehicles produced on each production line sometimes extremely increases or decreases according to the need of consumers or the like. If each of the production lines is made for exclusive-use for a particular type of vehicles as in the above-described prior art there occurs a case where one production line may be operating while the other production line must stop operation after having produced a predetermined number of vehicles. This is not preferable in terms of improving the production efficiency.

Further, in another case, the same type of vehicles are produced by a plurality of production lines to keep balance of the numbers of vehicles produced in the production lines. In this case, however, when a model of vehicles is changed, it is necessary to newly provide exclusive-use equipments for the production lines. Particularly, in a welding step, there are many exclusive-use equipments for each type of vehicle. It is therefore an important condition for securing the flexibility of a vehicle production system to suppress an occurrence of exclusive-use investment in the welding step.

SUMMARY OF THE INVENTION

The present invention has been accomplished in view of the above-described circumstances. An object of the present invention is to provide a method for producing vehicles in which when it becomes necessary to increase or decrease the number of vehicles produced in production lines, it is possible to produce vehicles with good efficiency without changing the production ability of each step after a welding step, merely by adjusting the number of vehicles in the welding step in a production line which has less of a margin for production.

For achieving the above object, according to the present invention, there is provided a method for producing vehicles by using a plurality of production lines allowing the vehicles to successively pass through a welding step, a coating step and an assembling step in each of the production lines, wherein the plurality of production lines include at least first and second production lines, and in accordance with an increase or decrease in a number of vehicles to be produced in the respective production lines, some of the vehicles in the second production line that has a less margin for producing vehicles are transferred, after passage through the welding step, to the first production line having a more margin for production at a portion between a welding step and a coating step.

According to this method, only by adjusting the number of vehicles in the welding step in the production line which is busy, it is possible to effectively produce vehicles without changing the productivity of each step after the a welding step. With this method, it is possible to cope with an increase or decrease in the number of vehicles without changing exclusive-use equipment for the welding step which is expensive.

Further, according to the invention, there is provided an apparatus for producing vehicles, the apparatus being provided with first and second production lines for allowing the vehicles to successively pass through a welding step, a coating step and an assembling step in each of the production lines, comprising: a first vehicle transporting means conducting a portion of transporting of vehicles from the welding step to the coating step in one of the production lines; a second vehicle transporting means provided substantially parallel with the first vehicle transporting means and capable of switching a transporting direction normally and reversely; a first delivering and receiving means between an upstream end of the first vehicle transporting means and one of opposite ends of the second vehicle transporting means and capable of delivering and receiving the vehicles to and from either one of the first and second transporting means; and a second delivering and receiving means between the other end of the second vehicle transporting means and an intermediate portion between the welding step and the coating step of the other of the production lines and capable of delivering and receiving the vehicles to and from either one of the second vehicle transporting means and the intermediate portion of the other production line.

With the above arrangement, it is possible to deliver and receive vehicles between both the production lines in response to an increase or decrease of the production of vehicles without changing the exclusive-use equipment of the welding step whose equipment cost is large.

The above and other objects, features and advantages of the invention will become apparent from the following description of the preferred embodiments taken in conjunction with the accompanying drawings.

BRIEF DESCRIPTION OF THE DRAWINGS

FIGS. 1 to 8 show one embodiment of the present invention; wherein

DESCRIPTION OF THE PREFERRED EMBODIMENT

One embodiment of the present invention will be described below with reference to the drawings.

Figure 1:
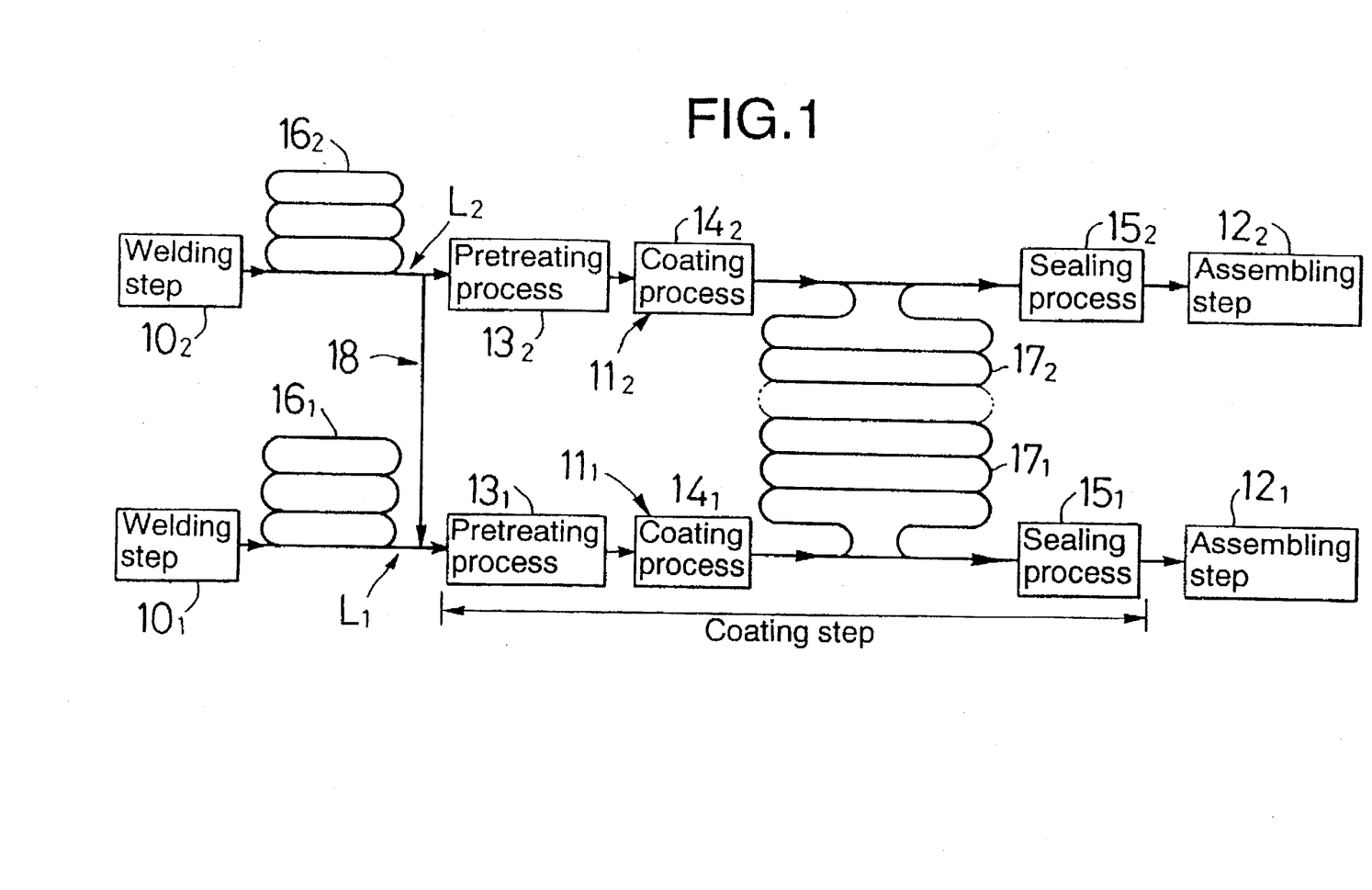
FIG. 1 is a view showing a flow of first and second production lines.

First, in FIG. 1, first and second production lines $L_1$ and $L_2$ produce one or a plurality of types of vehicles different from one another. In both the production lines $L_1$ and $L_2$, vehicles are produced by successively passing through welding steps $10_1$ and $10_2$, coating steps $11_1$ and $11_2$ and assembling steps $12_1$ and $12_2$, respectively. The coating steps $11_1$ and $11_2$ are made of successively arranged pretreating processes $13_1$ and $13_2$; coating processes $14_1$ and $14_2$ including an undercoat, an intercoat and a topcoat; and sealing processes $15_1$ and $15_2$, respectively. Storing sections $16_1$ and $16_2$ for temporarily storing vehicles are provided in both the production lines $L_1$ and $L_2$ between the welding steps $10_1$ and $10_2$ and the coating steps $11_1$ and $11_2$, respectively. Storing sections $17_1$ and $17_2$ for temporarily storing vehicles are; provided in both the production lines $L_1$ and $L_2$ between the coating processes $14_1$ and $14_2$ in the coating steps $11_1$ and $11_2$ and the sealing processes $15_1$ and $15_2$, respectively. Both the storing sections $17_1$ and $17_2$ may be connected with each other as indicated by the chain lines.

When the vehicle are produced in the first and second production lines $L_1$ and $L_2$, respectively, the number of vehicles produced in both the production lines $L_1$ and $L_2$ may sometimes be increased or decreased according to the needs of consumers or the like. In that case, it is not preferable, in terms of improving the production efficiency, to elongate the working time in one of the production lines $L_1$ and $L_2$ so as to enhance the productivity, and to stop the production in the other production line before completion of the working time.

In vehicle production factories, it is not unusual that the working time becomes long such as 16 hours a day. In such a case, a manshift is divided into two (2-shifts system or two rotation system). In this case, some members of the factory work, e.g., from 6:45 to 15:15, and other members work, e.g., from 15:15 to 23:25. In this application, the former manshift (from 6:45 to 15:15) will be hereinafter referred to as a first shift $1S_1$, and the latter shift (from 15:15 to 23:25) will be hereinafter referred to as a second shift $2S_1$.

Here, it is supposed that the 2-shifts system is employed in the first production line $L_1$ for producing vehicles, and a single shift system (no rotation) is employed in the second production line $L_2$. In such a situation, if the production of vehicles increases in the second production line $L_2$ and the production of vehicles decreases in the first production line $L_1$, it may become necessary to elongate the working time in the second production line $L_2$, but to stop production in the first production line $L_1$ before completion of the working time of the second shift. In such a case, if the first production line $L_1$ can produce the same vehicles as the second production line $L_1$ produces, it may be possible to keep balance of the working time of the members in both the lines of the factory. However, in order to do so, additional equipment need be installed in the first production line $L_1$ for exclusive sue to meet the change of the type of vehicles produced. Particularly, the welding step $10_1$ will require many exclusive-use equipments for each type of vehicles, which requires extremely expensive exclusive-use investment.

It is therefore important to minimize the equipment investment by suppressing the necessity of exclusive-use investment at least in the welding step $10_1$ to cope with the increase in the number of vehicles produced in the second production line $L_2$ and to improve the production efficiency while keeping a good balance between the production lines $L_1$ and $L_2$. The present invention is based on the above-described viewpoint, and is for making it possible to produce vehicles with good efficiency without changing the production ability after the welding step, only by adjusting the number of vehicles at the welding step $10_2$ in the second production line $L_2$.

More specifically, if the production of vehicles in the first production line $L_1$ decreases while the production of vehicles in the second production line $L_2$ increases, vehicles of such increased amount in the second production line $L_2$ which now becomes busy are transferred, after passing through the welding step $10_2$, into the first production line $L_1$ at a portion between the welding step $10_1$ and the coating step $11_1$, which line $L_1$ now has an ability to produce more vehicles.

Here, there is provided a vehicle delivery/receiving apparatus 18 capable of delivering and receiving vehicles between both the production lines $L_1$ and $L_2$ at portions between the welding step $10_2$ and the coating step $11_2$ in the second production line $10_1$ and between the welding step $10_1$ and the coating step $11_1$ in the first production line $L_1$, respectively.

Figure 2:
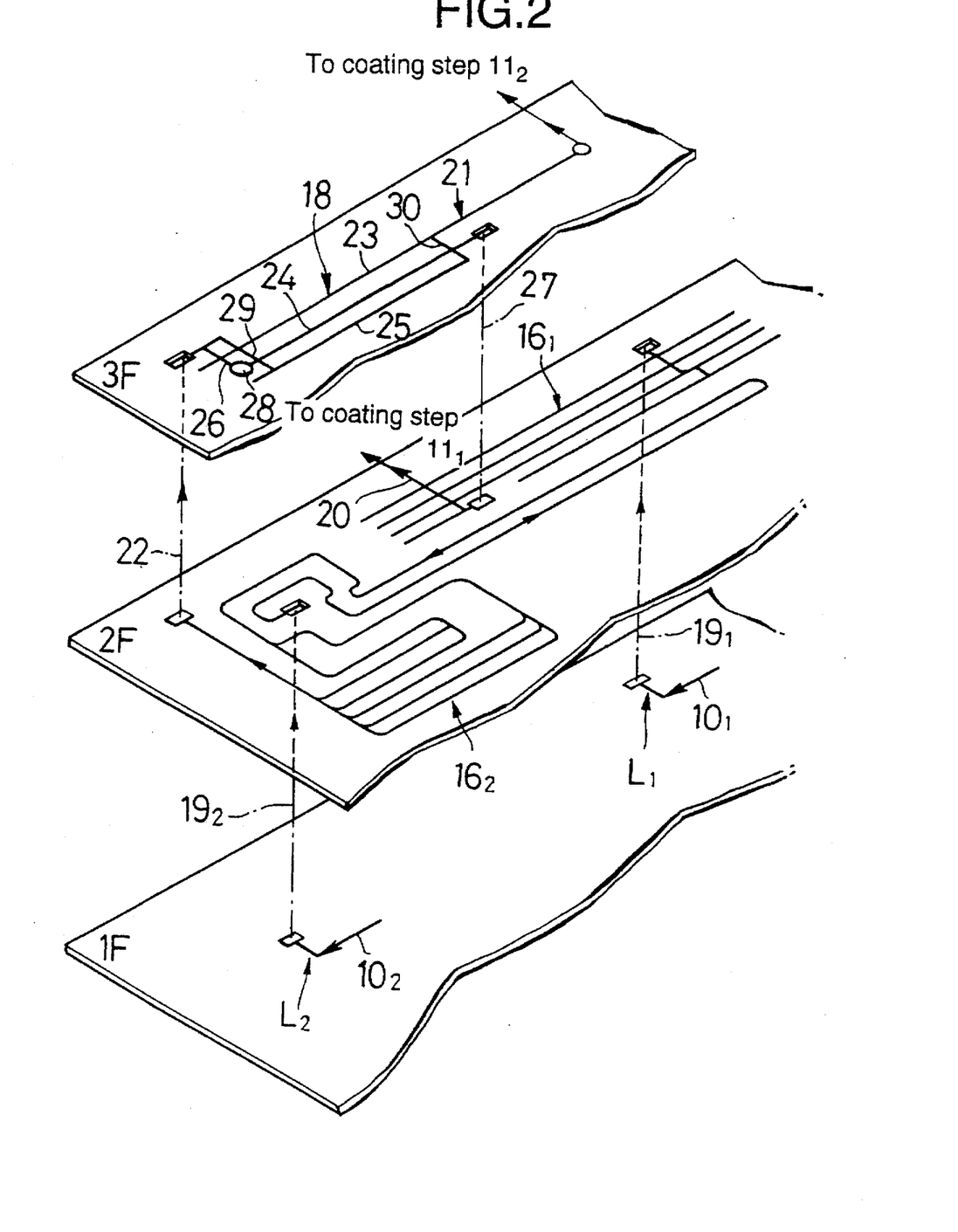
FIG. 2 is an arrangement view of an apparatus for delivering and receiving vehicles between first and second production lines.

In FIG. 2, the first and second production lines $L_1$ and $L_2$ are arranged over a plurality of floors in a vehicle producing factory. For example, on the first floor (1F), main portions of the welding steps $10_1$ and $10_2$ are performed, and on the second floor (2F), storing sections $16_1$ and $16_2$ for temporarily storing vehicles between the welding steps $10_1$, $10_2$ and the coating steps $11_1$, $11_2$ are provided. In the first production line $L_1$, an elevator $19_1$ is provided between the first floor (1F) and the second floor (2F) for transporting vehicles from the welding step $10_1$ on the first floor (1F) to the storing section $16_1$ on the second floor (2F). In the second production line $L_2$, an elevator $19_2$ is provided between the first floor (1F) and the second floor (2F) for transporting vehicles from the welding step $10_2$ on the first floor (1F) to the storing section $16_2$ on the second floor (2F). Moreover, a transporting apparatus 20 for transporting vehicles to the coating step $11_1$ is connected to the storing section $16_1$ in the first production line $L_1$ on the second floor (2F). On the third floor (3F), there is provided a transporting apparatus 21 for transporting vehicles to the coating step $11_2$ in the second production line $L_2$, and an elevator 22 for lifting vehicles from the storing section $16_2$ of the second floor is connected to the upstream end of the transporting apparatus 21.

Figure 3:
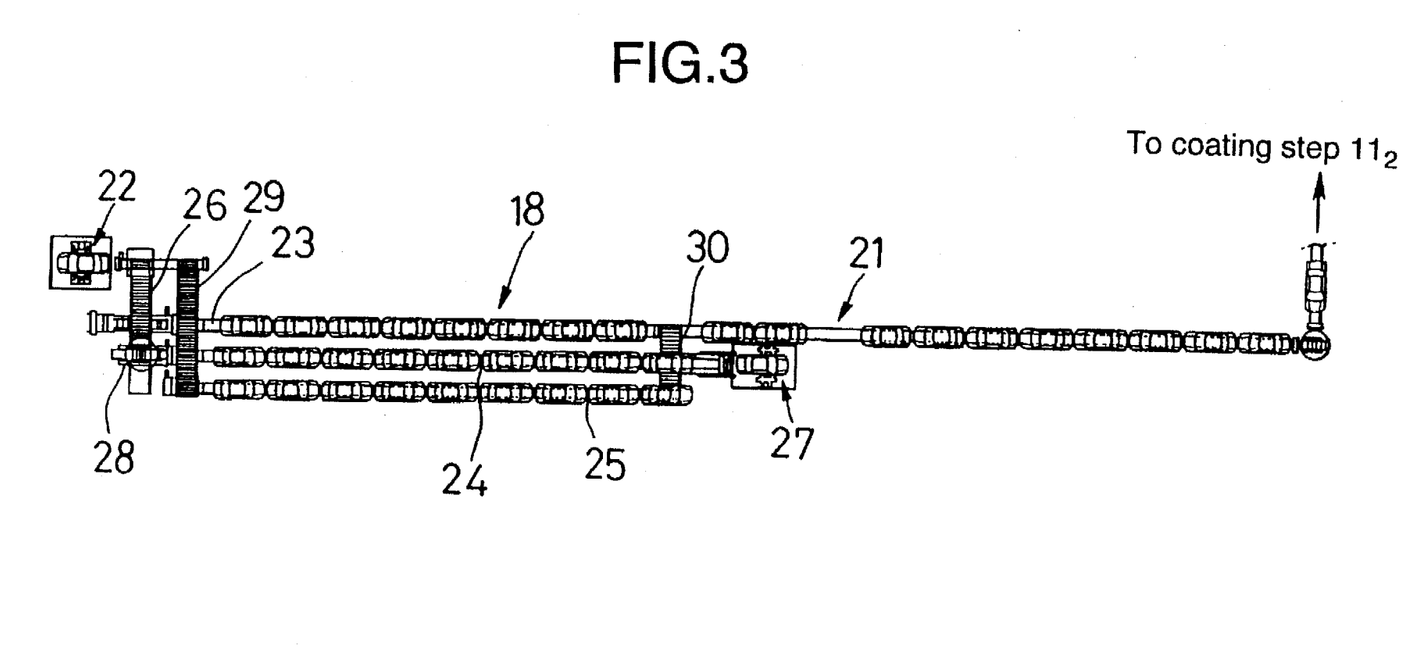
FIG. 3 is a plan view of a vehicle delivering and receiving apparatus.

Referring also to FIG. 3, the vehicle delivering and receiving apparatus 18 is disposed on the third floor (3F) and includes: a first vehicle transporting means 23 constituting a portion of the transporting apparatus 21 in the second production line $L_2$; a second vehicle transporting means 24 provided parallel with the first vehicle transporting means 23 and capable of switching a transporting direction normally and reversely; a third vehicle transporting means 25 provided parallel with the first and second vehicle transporting means 23 and 24 and capable of switching a transporting direction normally and reversely; a first delivering and receiving means 26 capable of delivering and receiving vehicles on either side between the upstream end of the first vehicle transporting means 23 and one end of the second vehicle transporting means 24; a second delivering and receiving means 27 capable of delivering and receiving vehicles on either side between the other end of the second vehicle transporting means 24 and an intermediate portion between the welding step $10_1$ and the coating step $11_1$ in the first production line $L_1$, i.e., the storing section $16_1$; a vehicle attitude conversion means 28 provided on the first delivering and receiving means 26 at a portion corresponding to the one end of the second vehicle transporting means 24; and third and fourth delivering and receiving means 29 and 30 provided over one end side and the other end side, respectively, of the first to third vehicle transporting means 23 to 25.

The transporting apparatus 21 is, for example, a floor conveyor which transports vehicles moved up onto the third floor (3F) by the elevator 22 toward the coating step $11_2$. The first vehicle transporting means 23 constitutes a portion of the transporting apparatus 21 and extends in a linear fashion. The first vehicle transporting means 23 is disposed on the third floor (3F). Further, the second and third vehicle transporting means 24 and 25 are floor conveyors laid on the third floor (3F), which are capable of transporting vehicles in either normal or reverse direction.

The first delivering and receiving means 26 is a normal and reverse switchable conveyer laid on the third floor (3F) so as to extend at right angles with respect to the lengthwise direction of the first and second vehicle transporting means 23 and 24. The first delivering and receiving means 26 is capable of transferring a vehicle moved up onto the third floor (3F) by the elevator 22 to the one end of the second vehicle transporting means 24 and also capable of transferring a vehicle transported to the one end of the second vehicle transporting means 24 to the upstream end of the first vehicle transporting means 23. Further, the second delivering and receiving means 27 is capable of vertically moving a vehicle between the storing section $16_1$ in the first production line $L_1$ which is on the second floor (2F) and the other end of the second vehicle transporting means 24 which is on the third floor (3F). The second delivering and receiving means 27 is capable of transporting a vehicle from the second vehicle transporting means 24 to the storing section $16_1$ in the first production line $L_1$, and also capable of transporting a vehicle from the storing section $16_1$ to the second transporting means 24.

The vehicle attitude conversion means 28 is capable of converting the direction of a vehicle through 180 degrees. In a case where the directions of transporting vehicles along the first and second production lines $L_1$ and $L_2$ are different from each other by 180 degrees, when vehicles flowing in the second production line $L_2$ are transferred to the second vehicle transporting means 25 by the first delivering and receiving means 26 and when vehicles flowing in the first production line $L_1$ are transferred from the second vehicle transporting means 24 to the first vehicle transporting means 23 through the first delivering and receiving means 26, the direction of vehicles can be converted by 180 degrees by the vehicle attitude conversion means 28.

The third and fourth delivering and receiving means 29 and 30 are normal and reverse switchable conveyers which respectively extend over one end side and the other end side of the vehicle transporting means 23 to 25 at right angles with respect to the vehicle transporting means 23 to 25 and are laid on the third floor (3F). Vehicles can be delivered and received between the first to third vehicle transporting means 23 to 25 by the third and fourth delivering and receiving means 29 and 30.

By the vehicle delivering and receiving apparatus 18, vehicles after passing through the welding step $10_2$ in the second production line $L_2$ can be transferred by elevator 22 to a portion of the first production line $L_1$ between the welding step $10_1$ and the coating step $11_1$ by successively passing them through the first delivering and receiving means 26, the second vehicle transporting means 24 and the second delivering and receiving means 27 from the elevator 22 so as to transport the vehicles to the storing section $16_1$. Further, vehicles after passing through the welding step $10_1$ in the first production line $L_1$ can be transferred by the second delivering and receiving means 27 to a portion of the second production line $L_2$ between the welding step $10_2$ and the coating step $11_2$ by successively passing them through the second delivering and receiving means 24 and the first delivering and receiving means 26 from the second delivering and receiving means 27 so as to transport the vehicles to the first vehicle transporting means 23. In either case, the direction of the vehicles can be converted by 180 degrees by the vehicle attitude conversion means 28 thereby to adjust the direction of the vehicles to meet the transporting direction in both the production lines $L_1$ and $L_2$.

In the vehicle delivering and receiving apparatus 18, the third vehicle transporting means 25 can be used to temporarily store a vehicle, which needs a repair among vehicles flowing in the first and second production lines $L_1$ and $L_2$. Such vehicle having been repaired by the third vehicle transporting means 25 can be returned to any of the first and second production lines $L_1$ and $L_2$ by the third and fourth delivering and receiving means 29 and 30.

Figure 4:
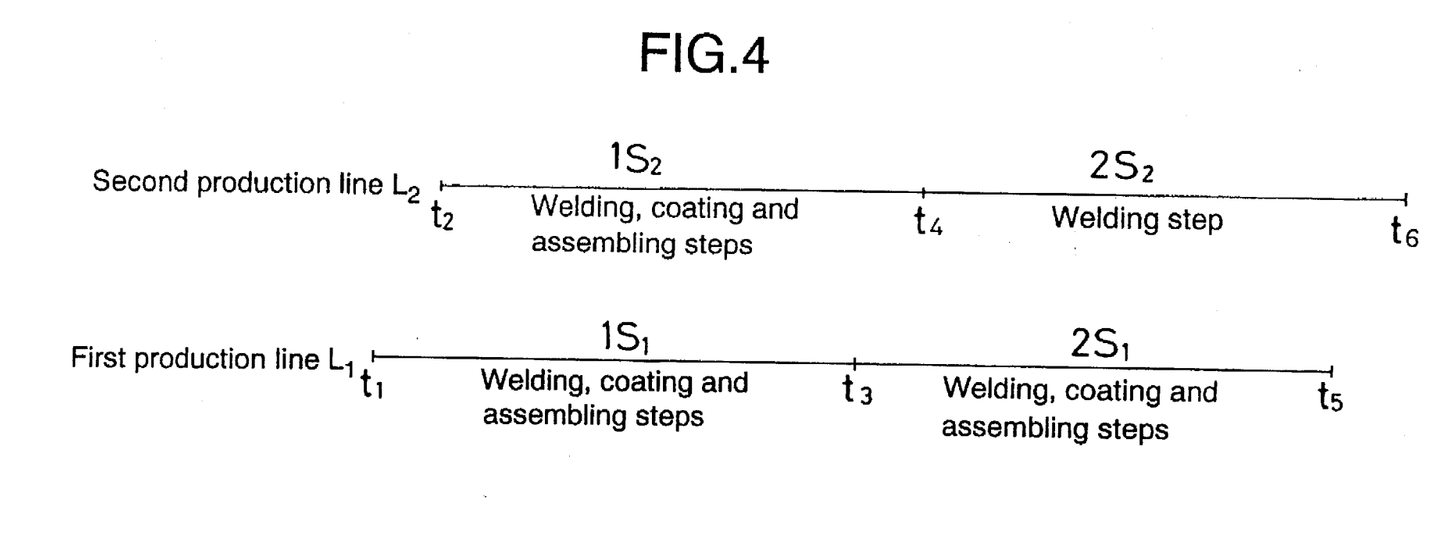
FIG. 4 is a view showing an operating time of the first and second production lines.

The vehicles in an increased amount in the second production line $L_2$ which is busy are transferred by the vehicle delivering and receiving apparatus 18, after passing through the welding step $10_2$, into the portion between the welding step $10_1$ and the coating step $11_1$ of the first production line $L_1$ which has a margin for producing more vehicles because of a reduction in the required number of vehicles produced. The operating times of the first and second production lines $L_1$ and $L_2$ at that time are set as shown in FIG. 4.

That is, in the first production line $L_1$, vehicles are produced in the 2-shifts system consisting of the first shift $1S_1$ for executing the steps of welding, coating and assembling from a time $t_1$ (e.g., 6:45) to a time $t_3$ (e.g., 15:15), and a second shift $2S_1$ for executing the steps of welding, coating and assembling from the time $t_3$ to a time $t_5$ (e.g., 23:25). On the other hand, in the second production line $L_2$, the steps of welding, coating and assembling are executed in a single shift $1S_2$ from a time $t_2$ (e.g., 7:45) to a time $t_4$ (e.g., 16:45) to produce vehicles. An irregular two-shift $2S_2$ from the time $t_4$ to a time $t_6$ (e.g., 0:55) may be set in accordance with an increase in the number of vehicles. In the irregular 2-shifts work $2S_2$, only the welding step is in the operating state, and the coating and assembling steps are in the stopped state.

In the vehicle production by such working system, a flow of vehicles in the first and second production lines will be described with reference to FIGS. 5 to 8. In FIGS. 5 to 8, ○ indicates vehicles produced in the first production line $L_1$, □ indicates vehicles produced in the second production line $L_2$, ■ indicates vehicles which must be produced as an increased amount, by the second production line $L_2$, and portions surrounded by the chain lines indicates the operation stopped state.

Figure 5:
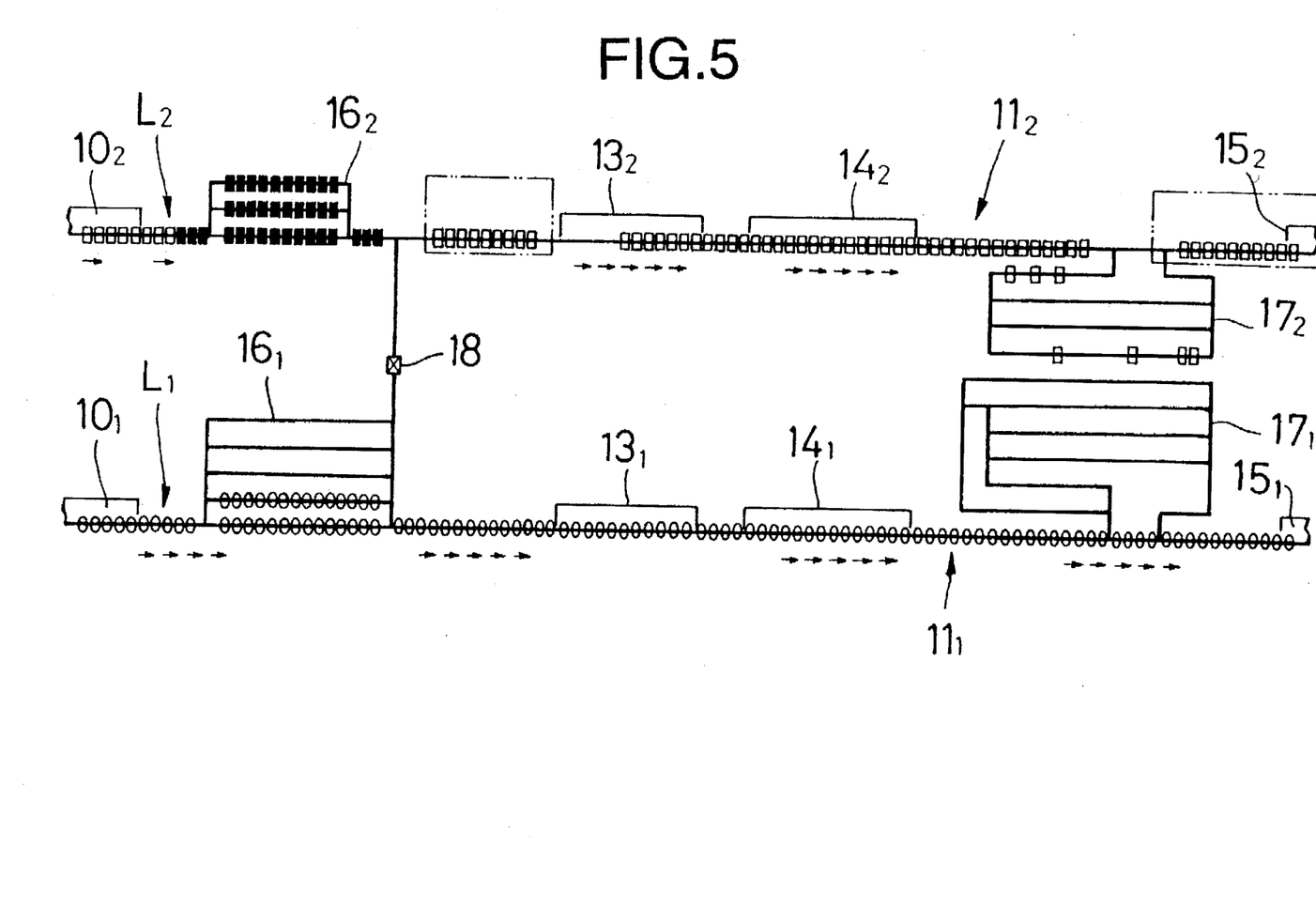
FIG. 5 is a view showing a flow of vehicles after completion of a usual work in the second production line.

First, in FIG. 5, at the time of completion of the usual work (i.e., the time $t_4$ in FIG. 4) in the second production line $L_2$, the step after the storing section $17_2$, i.e., the sealing process $15_2$ and following steps and the process in the coating step $11_2$ for transporting vehicles to the pretreating process $13_2$ in the coating step $11_2$ are in the operation stopped state. The vehicles having passed through the welding step $10_2$ are stored, as vehicles which must be produced, as the increased amount in the storing section $16_2$. And vehicles which exist in the pretreating process $13_2$ in the coating step $11_2$ and the coating process $14_2$ successively pass through these steps $13_2$ and $14_2$ and are successively stored in the storing section $17_2$.

Figure 6:
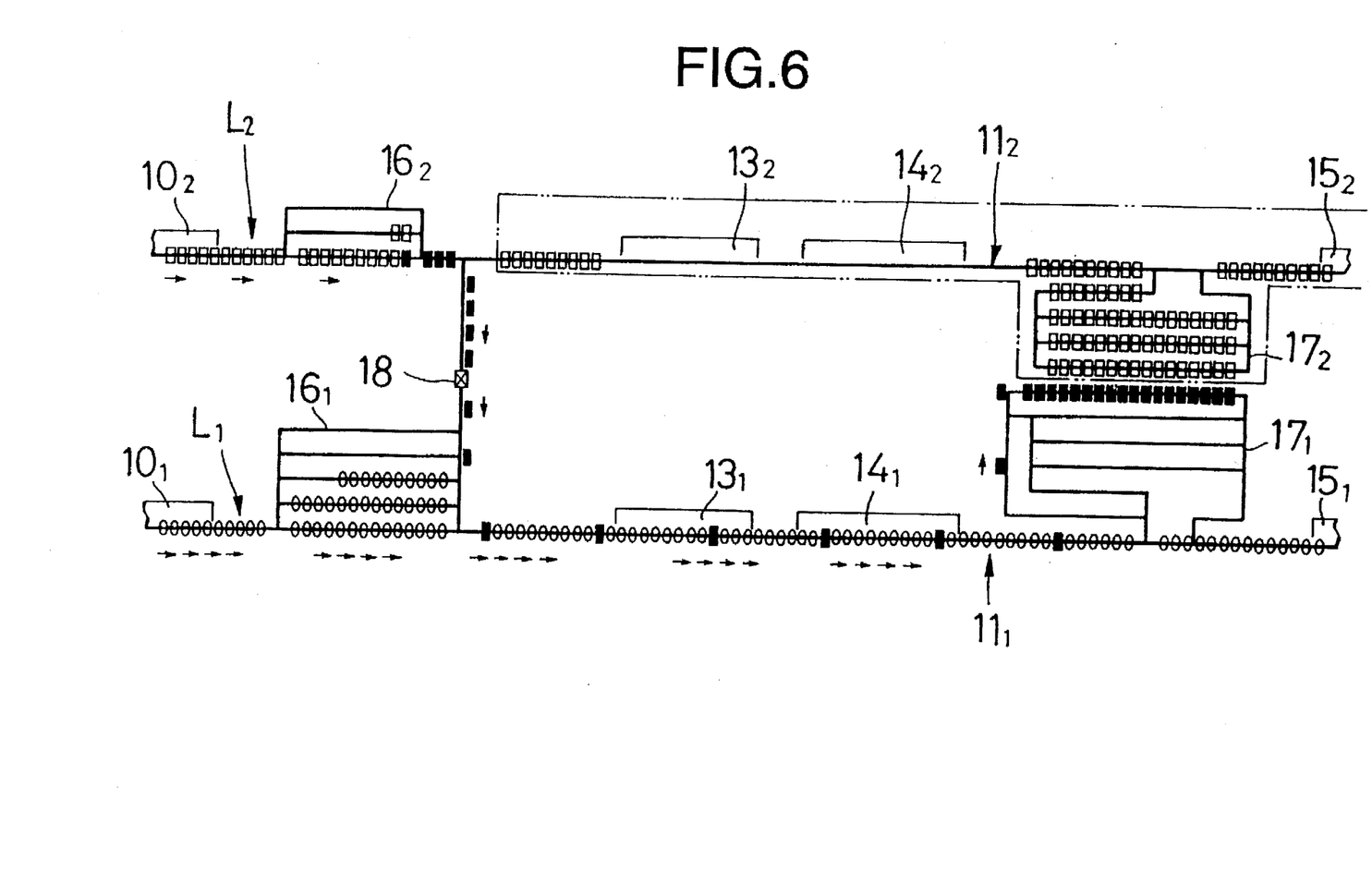
FIG. 6 is a view showing a flow of vehicles in the welding step of the second production line and during the operation of all the steps in the first production line.

In FIG. 6, when the working system is in the second shift $2S_1$ in the first production line $L_1$ and in the irregular 2-shifts work $2S_2$ in the second production line $L_2$, the vehicles which must be produced as the increased amount and stored in the storing section $16_2$ of the second production line $L_2$ are transferred to the first production line $L_1$ between the welding step $10_1$ and the coating step $11_1$ in a manner so as to be arbitrarily inserted at any time between the vehicles having passed through the welding step $10_1$ in the first production line $L_1$, by means of the vehicle delivering and receiving apparatus 18. In the first production line $L_1$, the vehicles received from the second production line $L_2$ are stored in the storing section $17_1$ between the coating step $14_1$ in the coating process $11_1$ and the sealing process $15_1$.

Figure 7:
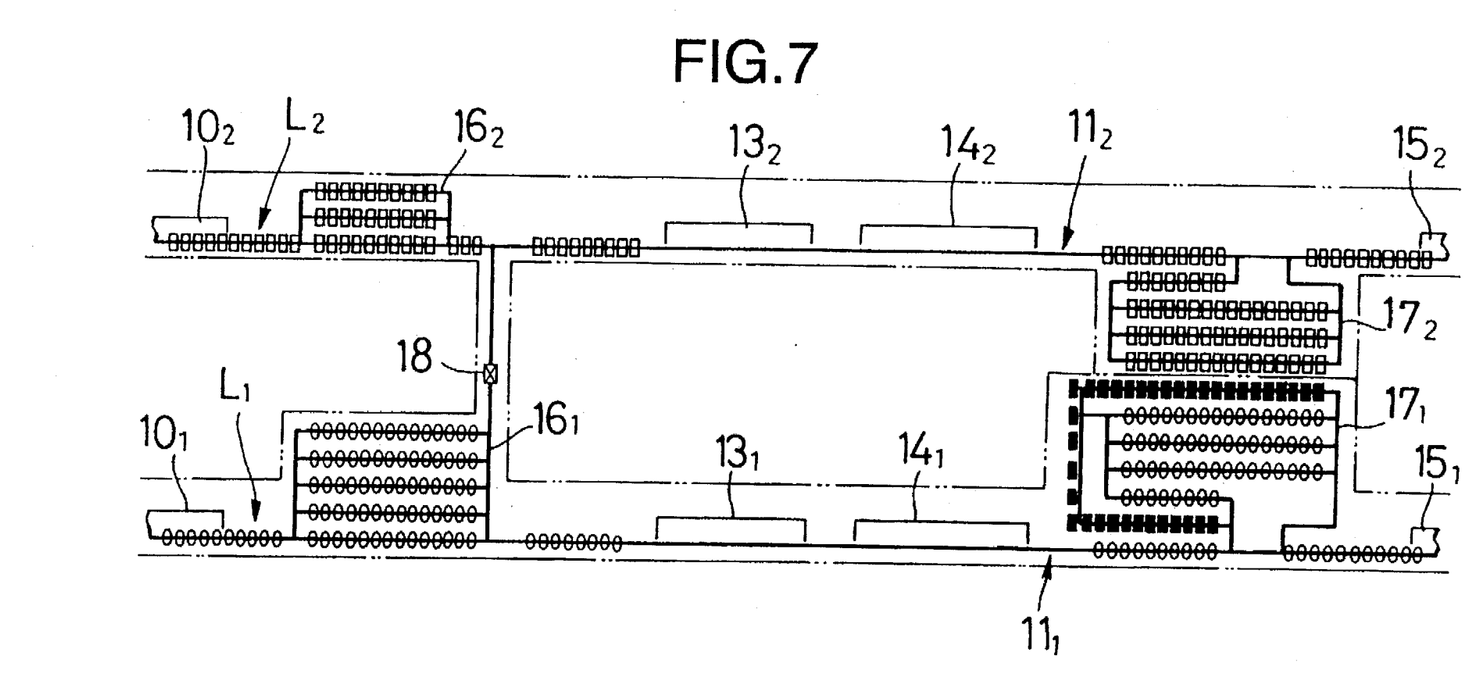
FIG. 7 is a view showing the completion of operation in the first and second production lines.
Figure 8:
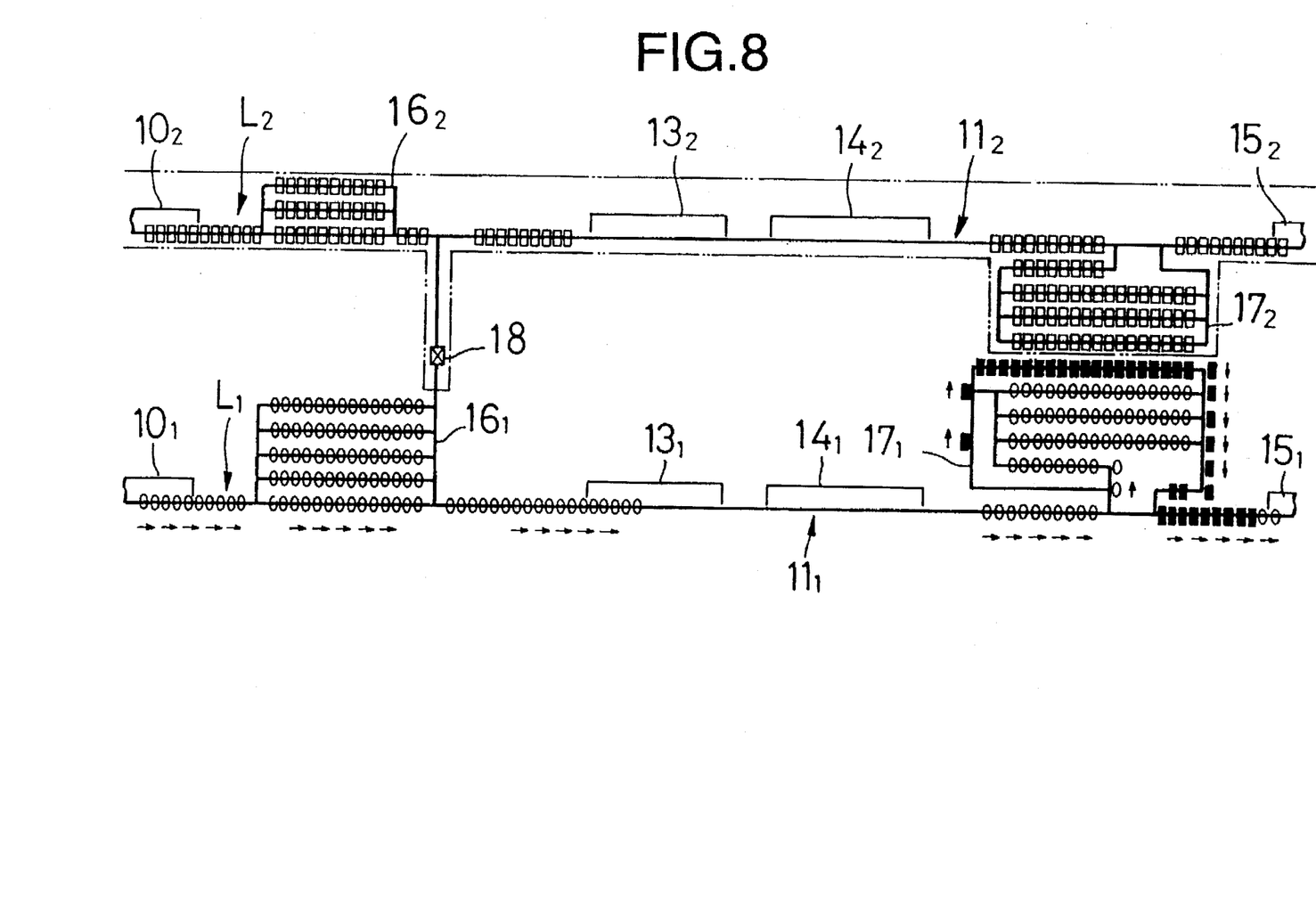
FIG. 8 is a view showing a flow of vehicles when operation starts in the first production line.

At the time of completion of the operation in the first and second production lines, as shown in FIG. 7, all the steps in both the production lines $L_1$ and $L_2$ are in the operation-stopped state. Then, at the time of start of the 1-shift $1S_1$ in the first production line $L_1$, as shown in FIG. 8, the vehicles which must be produced as the increased amount and temporarily stored in the storing section $17_1$ are continuously flowed to the steps after the sealing process $15_1$.

Next, the operation of the above embodiment will be described.

When the second production line $L_2$ becomes busy or has a less margin for production because a number of vehicles to be produced is increased, whereas a number of vehicles to be produced is decreased in the first production line $L_1$, vehicles which must be produced by the second production line $L_2$ as an increased amount are transferred to a portion between the welding step $10_1$ and the coating step $11_1$ in the first production line $L_1$ after passage through the welding step $10_2$. Therefore, in the first production line $L_1$, although the equipment must be slightly changed in the steps after the coating step $11_1$ in accordance with the vehicles received from the second production line $L_2$, it is unnecessary to change the equipment of the welding step $10_1$ which has involved a large exclusive-use investment cost and it is possible to cope with an increase in the number of vehicles produced. Vehicles can be produced with high efficiency without changing the production ability after the coating steps $11_1$ and $11_2$, only by adjusting the number of vehicles at the welding step $10_2$ in the second production line $L_2$.

The vehicles transferred to the first production line $L_1$ from the second production line $L_2$ are temporarily stored in the storing section $17_1$ prior to the assembling step $12_1$, after which the vehicles are continuously transferred to the assembling step $12_1$ whereby assembling of the same type of vehicles can be carried out in the assembling step $12_1$. Therefore, replacement of assembling tools or the like in the assembling step $12_1$ can be collectively carried out, and the working efficiency of assembly can be enhanced.

Moreover, the vehicle delivering and receiving apparatus 18 provided between the welding step $10_2$ and the coating step $11_2$ in the second production line $L_2$ and between the welding step $10_1$ and the coating step $11_1$ in the first production line $L_1$ includes: the first vehicle transporting means 23 constituting a portion of the transporting apparatus 21 in the second production line $L_2$; the second vehicle transporting means 24 provided parallel with the first vehicle transporting means 23 and capable of switching a transporting direction normally and reversely; the first delivering and receiving means 26 capable of delivering and receiving vehicles on either side between the upstream end of the first vehicle transporting means 23 and one end of the second vehicle transporting means 24; and the second delivering and receiving means 27 capable of delivering and receiving vehicles on either side between an intermediary portion between the welding step $10_1$ and the coating step $11_1$ in the first production line $L_1$, and the other end of the second vehicle transporting means 24. Therefore, it is possible to switch the transportation of vehicles from the second production line $L_2$ to the first production line $L_1$ and the transportation of vehicles from the first production line $L_1$ to the second production line $L_2$. Thus, even if it becomes necessary to increase the production of vehicles in either of the first and second production lines $L_1$ and $L_2$, it is possible to easily cope with such increase.

Further, the vehicle attitude conversion means 28 is provided on the first delivering and receiving means 26 at a portion corresponding to one end of the second vehicle transporting means 24 whereby even if the directions of vehicles along the vehicle transporting direction in the first and second production lines $L_1$ and $L_2$ are mutually reversed, it becomes possible to deliver and receive the vehicles between the first and second production lines $L_1$ and $L_2$.

Furthermore, the third vehicle transporting means 25 capable of switching a transporting direction normally and reversely is provided parallel with the first and second vehicle transporting means 23 and 24, and the third and fourth delivering and receiving means 29 and 30 are provided to extend over one end side and the other end side of the first to third vehicle transporting means 23 to 25, whereby vehicles can be temporarily stored in the third vehicle transporting means 25 for their repair from either of first and second production lines $L_1$ and $L_2$.

Although the embodiment of the present invention has been described in detail, it will be understood that the present invention is not limited to this embodiment, and various modifications may be made.

What is claimed is:

1. An apparatus for producing vehicles, said apparatus being provided with first and second production lines for allowing the vehicles to successively pass through a welding step, a coating step and an assembling step in each of said production lines, comprising: a first vehicle transporting means conducting a portion of transporting of vehicles from the welding step to the coating step in one of said production lines; a second vehicle transporting means provided substantially parallel with said first vehicle transporting means and capable of transporting vehicles forwardly and reversely; a first delivering and receiving means between an upstream end of said first vehicle transporting means and one end of said second vehicle transporting means and capable of delivering and receiving vehicles to and from either one of said first and second transporting means; and a second delivering and receiving means between an opposite end of the second vehicle transporting means and an intermediate portion between the welding step and the coating step of the other of said production lines and capable of delivering and receiving vehicles to and from either one of said second vehicle transporting means and said intermediate portion of the other production line.

2. The apparatus according to claim 1, further comprising a vehicle attitude conversion means provided on the first delivering and receiving means at a portion thereof corresponding to said one end of the second vehicle transporting means for converting a direction of a vehicle through 180 degrees.

3. The apparatus according to claim 1 or 2, further comprising a third vehicle transporting means provided substantially parallel with the first and second vehicle transporting means and capable of transporting vehicles forwardly and reversely, and third and fourth delivering and receiving means respectively provided at opposite ends of said first, second and third vehicle transporting means for delivering and receiving vehicles to and from either of said first, second and third vehicle transporting means.

* * * * *